United States Patent
Campion et al.

(10) Patent No.: US 6,201,917 B1
(45) Date of Patent: Mar. 13, 2001

(54) PREFORM INCLUDING A BARRIER LAYER PREVENTING HYDROGEN FROM DIFFUSING INTO OPTICAL FIBER MANUFACTURED FROM SAID PERFORM, AND A METHOD OF PREPARING SUCH A PREFORM

(75) Inventors: Jean-Florent Campion, Bois Colombes; Sophie Dubois, Germain En Laye; Gérard Orcel, Laffitte, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/329,200

(22) Filed: Jun. 10, 1999

(30) Foreign Application Priority Data

Apr. 26, 1999 (FR) .................................................. 99 05242

(51) Int. Cl.$^7$ ................................. G02B 6/02; B29B 7/00
(52) U.S. Cl. .................... 385/123; 385/124; 385/126; 65/417; 65/431; 628/542.8
(58) Field of Search ....................................... 385/123, 124, 385/126, 127, 128; 65/420, 417, 430, 431; 427/116, 164, 167, 231, 376.2; 428/562.8

(56) References Cited

U.S. PATENT DOCUMENTS

| 4,540,601 | | 9/1985 | Nath . | |
|---|---|---|---|---|
| 5,198,270 | * | 3/1993 | Andrejco et al. | 427/230 |
| 5,474,588 | * | 12/1995 | Tanaka et al. | 65/390 |
| 5,790,736 | * | 8/1998 | Fabian | 385/128 |
| 5,991,486 | * | 11/1999 | Braglia | 385/123 |

FOREIGN PATENT DOCUMENTS

| 0 936 194 A1 | 8/1999 | (EP) . |
|---|---|---|
| 2 145 840 | 4/1985 | (GB) . |

* cited by examiner

*Primary Examiner*—Hemang Sanghavi
(74) *Attorney, Agent, or Firm*—Sughrue, Mion, Zinn, Macpeak & Seas, PLLC

(57) ABSTRACT

An optical fiber preform comprising a core of radius R, and a sheath comprising cladding and outer sheath, wherein the outer sheath comprises an inner zone, and a peripheral zone made of silica doped with alumina and of thickness lying in the range 0.08 R to 2.2 R, and the proportion by weight of alumina in the peripheral zone is such that the equivalent concentration of alumina in the outer sheath as a whole lies in the range 100 ppm to 1000 ppm by weight of aluminum relative to silica. A method of manufacturing said preform, and an associated optical fiber.

10 Claims, 2 Drawing Sheets

PREFORM INCLUDING A BARRIER LAYER PREVENTING HYDROGEN FROM DIFFUSING INTO OPTICAL FIBER MANUFACTURED FROM SAID PERFORM, AND A METHOD OF PREPARING SUCH A PREFORM

The present invention relates to an optical fiber preform based on silica and comprising a core of radius R, and a sheath, said sheath comprising an optical inner portion in direct contact with the core, and referred to as the "cladding", and an outer portion referred to as the "outer sheath", said outer sheath being made of silica doped with alumina. The present invention also relates to a method of manufacturing said preform and to optical fiber manufactured by performing fiber-drawing on said preform.

BACKGROUND OF THE INVENTION

Optical conductors are commonly used in telecommunications. Optical fibers based on silica generally conveyed data at a wavelength approximately in the range 1300 nanometers to 1550 nanometers. Such an optical fiber is formed of an optically-active portion constituted by a core that conveys most of the light wave, and by cladding, the core and the cladding having different refractive indices. Such a fiber usually also has an outer peripheral portion that is not optically active and that is referred to as the "outer sheath" which, together with the cladding, forms the sheath of the optical fiber. Since an optical fiber is drawn down from a preform which is geometrically similar in section, the same terms "core", "cladding", and "outer sheath" are used for the preform from which the optical fiber is manufactured. Each fiber is protected by covering made of a polymer material, and such protective covering is often covered with other covering made of a colored polymer. A set of optical fibers may be assembled together to form a ribbon. In which case, the material holding together the fibers of the ribbon, which material is referred to as the "matrix", is also a polymer. In a telecommunications cable, the individual optical fibers or the ribbons of optical fibers are generally disposed in a tube made of metal or of a plastics material.

It is known that optical fibers must not be exposed to hydrogen because it degrades their transmission properties. The higher the hydrogen partial pressure to which the fiber is subjected, the worse the degradation. Hydrogen comes, in particular, from decomposition of the polymers of which the fiber covering or ribbon matrix is made. Hydrogen can also come from decomposition of the filler substance generally disposed in the cable in order to hold the fibers in the tube containing the optical fibers, and to prevent moisture from advancing in the event that the tube is broken or damaged. Such types of decomposition occur naturally due to aging.

Patent GB-B-2,145,240 mentions manufacturing optical fiber by performing fiber-drawing on an optical preform, and it describes said optical fiber comprising an optically-active portion made up of a core and of cladding, with the core and the cladding having different refractive indices, and of an outer sheath which, in addition to silica, contains a dopant belonging to a list of oxides. Among the list of oxides, alumina is mentioned and boron oxide is preferred. Neither the method of manufacturing the preform nor the structure of such a preform are specified. The structure of the final optical fiber is given by way of example and shown in a figure. That optical fiber comprises a core of radius R, made of doped silica, and of diameter 50 μm, corresponding to 2 R, and, around the core, a sheath that takes the diameter of the optical fiber to 125 μm, i.e 5 R, and that comprises cladding taking the diameter to 90 μm, i.e. 3.6 R, and an outer sheath, of thickness equal to 17.5 μm, i.e. 0.7 R. The concentration of oxide in said outer sheath preferably lies in the range 1% to 20% by weight of oxide relative to the composition of the outer sheath.

The presence of a large quantity of alumina in the outer sheath formed in that way makes it problematic to manufacture optical fiber from the preform under suitable conditions, in particular in terms of diameter stability during fiber-drawing, because the viscosity of the doped outer sheath is too low. With only 1% by weight of $Al_2O_3$ in silica, it is difficult to remain in the generally accepted tolerance bracket which is 125±0.5 μm, and the tolerance becomes equal to 125±1.5 μm. That makes it problematic to connect the optical fibers together.

Furthermore, it is important for the outer sheath obtained to offer good performance in terms of mechanical properties, and an outer sheath that is too thick, such as the sheath described in Patent GB-B-2,145,240 can cause a reduction in performance, in particular when subjected to traction testing.

OBJECTS AND SUMMARY OF THE INVENTION

An object of the present invention is to make it possible for an optical fiber that is almost impermeable to hydrogen and that has good strength to be manufactured industrially.

To this end, the invention provides an optical fiber preform based on silica and comprising a core of radius R, and a sheath, said sheath comprising an optical inner portion in direct contact with the core, and referred to as the "cladding", and an outer portion referred to as the "outer sheath", said outer sheath being made of silica doped with alumina, wherein the outer sheath itself comprises an inner portion in direct contact with the cladding and referred to as the "inner zone", and an outer portion in direct contact with the inner zone and referred to as the "peripheral zone" mainly comprising silica doped with alumina, wherein the thickness of said peripheral zone lies in the range 0.08 R to 2.2 R, and wherein the proportion by weight of alumina in the peripheral zone is such that the equivalent concentration of alumina in the outer sheath as a whole lies in the range 100 ppm to 1000 ppm by weight of aluminum relative to silica.

Preferably, the proportion by weight of alumina in the peripheral zone is such that the equivalent concentration of alumina in the outer sheath as a whole lies in the range 100 ppm to 500 ppm by weight of aluminum relative to silica.

Preferably, the thickness of the peripheral zone lies in the range 0.08 R to 1.5 R.

The equivalent concentration may be defined as the quantity of alumina contained in the peripheral zone in % weight of the volume of the outer sheath as a whole (and not only the volume of the peripheral zone). Since the preform is generally drawn down into an optical fiber of section that is geometrically similar, the equivalent concentration is the same in the preform and in the optical fiber. By way of example, in Patent GB-B-2,145,240, the minimum concentration of 1% by weight of alumina relative to the overall composition of the outer sheath gives a concentration of 1.01% by weight of alumina relative to silica in the outer sheath. That then gives an equivalent concentration of 10,100 ppm, in % weight of alumina relative to the silica contained in the outer sheath. Thus, since the ratio of the molar mass of alumina divided by the molar mass of aluminum is equal to 1.888, computation gives an equivalent concentration of alumina of about 5,350 ppm, by weight of aluminum relative to the silica contained in the outer sheath.

The alumina concentration of the peripheral zone is generally constant over the entire thickness of said peripheral zone, but it may also vary radially in continuous manner or in discontinuous manner.

The optical fiber preform of the invention makes use of a range of alumina concentrations and alumina thicknesses in the outer sheath that mitigates the drawbacks of the prior art, i.e. the outer sheath obtained offers good performance in terms of mechanical properties, and viscosity such that optical fiber can be manufactured in suitable manner from said preform, and in particular with an optical fiber diameter that is stable within the generally accepted tolerance bracket.

The preform of the invention advantageously has a peripheral zone of silica doped with alumina, which zone, once drawn down in geometrically similar manner, imparts high strength to the optical fiber manufactured from said preform. It should be noted that such a peripheral zone is generally of low roughness because it is melted during fiber-drawing.

Furthermore, the moderate thickness of the peripheral zone that is the precursor of the peripheral zone of the optical fiber manufactured from said preform, makes it possible to obtain a peripheral zone under compression, which greatly improves the mechanical properties of said optical fiber. A zone under compression is defined as having longitudinal stress whose effect is to compress the zone. The breaking mechanics of glass shows that the main breaking mechanism lies in the creation and propagation of surface cracks. By putting the surface of the fiber under compression, such a propagation phenomenon is avoided.

Finally, the fact that the peripheral zone is relatively remote from the optical core of the preform advantageously enables the hydrogen to be blocked as far away as possible from the optically-active portion, and thus to minimize the risk of increasing the attenuation of the optical fiber manufactured from said preform.

In an embodiment, the inner zone also contains alumina, in a proportion smaller than the proportion of the peripheral zone and such that the equivalent concentration of alumina in the outer sheath as a whole lies in the range 50 ppm to 200 ppm by weight of aluminum relative to silica. Preferably, the proportion of alumina in the inner zone is such that the equivalent concentration of alumina in the outer sheath as a whole lies in the range 50 ppm to 150 ppm by weight of aluminum relative to silica. The alumina concentration in the inner zone is generally constant over the entire thickness of said inner zone, but it may also vary radially, in continuous manner or in discontinuous manner.

Such an embodiment makes it possible, advantageously, to protect the optically active portion from hydrogen while also offering the advantages, in terms of strength for the optical fiber manufactured from said preform, of a peripheral zone that is more highly doped with alumina.

Advantageously, said embodiment makes it possible to provide a transition that is both physical and chemical between the peripheral zone and the cladding, with the alumina concentration tapering off more slowly going from the periphery of the preform to the core thereof.

The invention also provides a method of manufacturing the above-described silica-based optical fiber preform of the invention, wherein said peripheral zone is formed by externally depositing at least one layer of silica doped with alumina.

The method of the invention offers the advantage of enabling the peripheral zone doped with alumina to be located very accurately by using deposition techniques that are well known to the person skilled in the art. The method of the invention also offers the advantage of making it possible to deposit an amorphous alumina-silica binary composition. The amorphous nature of the binary composition makes it a good barrier to hydrogen diffusion. Conversely, an alumina-silica binary composition which is crystalline allows hydrogen to pass into the optical fiber manufactured from the preform, via grain boundaries or via diffusion channels inside the crystal.

In an implementation of the method of the invention, the external deposition method is performed by plasma building-up. Manufacturing the preform by using a lateral external deposition technique such as the plasma building-up technique is known, and described, for example, in Patent Application EP-A1-0 450 465. In another implementation of the method of the invention, the external deposition method is performed by "Outside Vapor Deposition" ("OVD"). The external deposition method may also be implemented using other methods such as sol-gel methods, impregnation, vapor deposition, or evaporation.

Finally, the invention provides an optical fiber manufactured by performing fiber-drawing on a preform of the invention.

The preform of the invention is advantageously such that manufacturing an optical fiber from said preform is compatible with the fiber-drawing speeds often used in manufacturing optical fiber by means of a fiber-drawing tower, which speeds are generally of the order of several hundred meters per minute. In addition, such deposition makes it possible to retain an existing fiber-drawing tower because it is on the preform that action is taken. In addition, such deposition is compatible with industrial fiber-drawing conditions, and in particular tolerance on optical fiber diameter for regulating the fiber-drawing method.

BRIEF DESCRIPTION OF THE DRAWINGS

The invention will be better understood, and other characteristics and advantages will appear on reading the following description given by way of non-limiting example and with reference to FIGS. 1 to 3, in which.

MORE DETAILED DESCRIPTION

Figure 1:
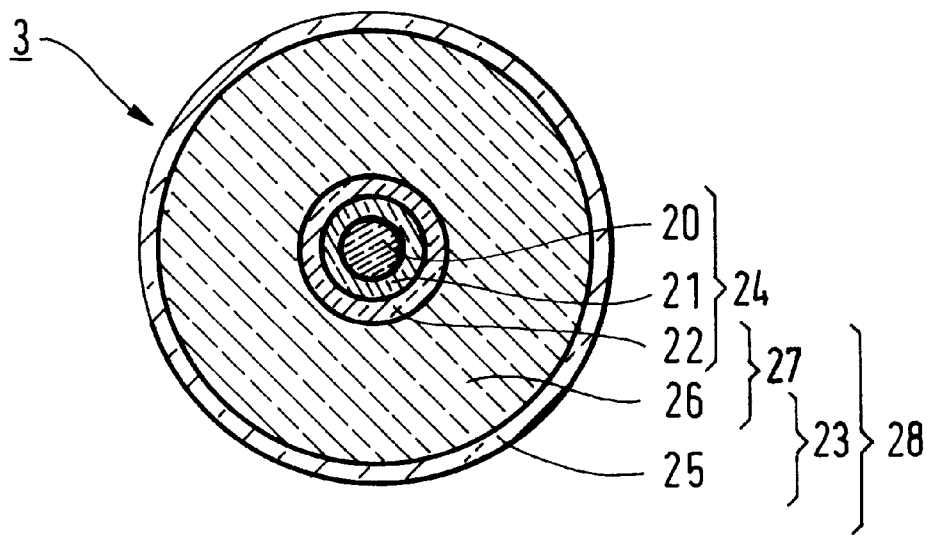
FIG. 1 is a diagrammatic section view of an optical fiber preform obtained using the method of the invention starting from a primary preform made using the MCVD method.

A primary preform 24, as shown in FIG. 1, is made, for example using the modified chemical vapor deposition (MCVD) method, by internally depositing layers based on optionally doped silica to form an optical core 20 and cladding 21 inside a tube 22, after which the tube as internally lined in this way is collapsed so as to transform it into a bar which constitutes the primary preform 24, and then a (final) preform 3 is made by externally depositing layers based on silica to form a build-up zone 23 on the primary preform 24. It is preferable to use a tube 22 that is of ultra-pure silica. Such external deposition is explained with reference to FIG. 2 for the case when plasma is used to perform the building up.

Forming a build-up zone 23, as shown in FIG. 1, starts by depositing silica in the form of grains on the primary preform 24. In the presence of plasma, the grains of silica are merely deposited by gravity from a feed duct constituted by a nozzle 5 which is moved in translation parallel to the primary preform 24. The grains of silica are fused and then vitrified by being subjected by the plasma to a temperature of about 2300° C. The building-up operation takes place in a closed chamber so as to provide protection against electromagnetic disturbances and against the ozone given off by a plasma torch 4.

In the invention, silica particles are deposited first by means of the nozzle 5 to form a portion 26 of the build-up zone 23, the composition of this portion being almost identical to that of the tube 22, i.e. ultra-pure silica. The portion 26 and the tube 22 together form an inner zone 27 of outer sheath 28. Then alumina particles mixed with the grains of silica in the nozzle 5 are deposited in a peripheral zone 25 of the build-up 23, which peripheral zone comprises all of the last external layers to be deposited in the build-up zone 23. It is also possible to deliver the silica via a first feed duct, and to deliver the alumina particles via a second feed duct, which ducts open out in the vicinity of the plasma torch 4 substantially close to the first silica feed duct 5. As indicated above, feeding alumina particles into the peripheral zone 25 of the build-up zone 23 makes it possible to manufacture an optical fiber 15 industrially by hot fiber-drawing, which optical fiber withstands hydrogen better than prior art optical fibers. A built-up preform 3 of the invention is thus obtained including a build-up zone 23 made up of a portion 26 and of a peripheral zone 25. The outer sheath 28 of said preform 3 comprises the tube 22 and the build-up zone 23, itself comprising the portion 26 and the peripheral zone 25. In an embodiment of the invention, it is possible to dope the portion 26 of the build-up zone 23 with a proportion of alumina that is smaller than that used in the zone 25. The alumina particles are fed at a proportion relative to the grains of silica that is a function of the purity of the silica grains and of the silica tube 22 of the primary preform 24.

Figure 2:
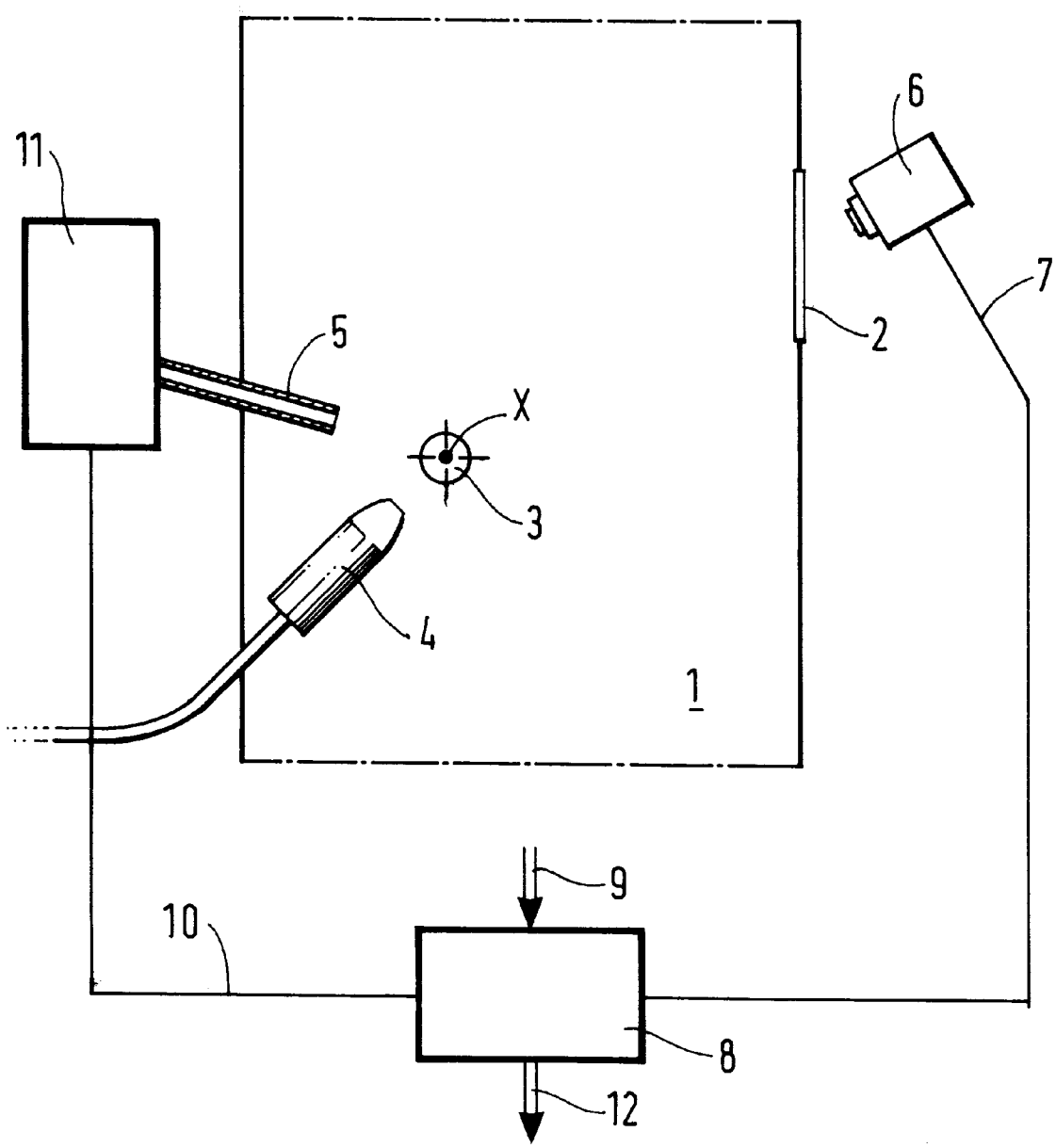
FIG. 2 is very diagrammatic view of plasma build-up apparatus in which the method of the invention is implemented.

FIG. 2 is a very diagrammatic view of plasma building-up apparatus including an enclosure 1 provided with a transparent window 2, and a preform 3 seen looking end-on, of longitudinal axis X, and towards which are directed the plasma torch 4 and the nozzle 5 for feeding in the build-up grains. Outside the enclosure 1, a CCD camera 6 disposed behind the window 2 is pointed towards the preform 3. It delivers a measurement of the diameter of the preform at the place towards which it points, in the form of a value transmitted via a link 7 to control apparatus 8 for controlling the build-up process. The apparatus 8 receives other indications about the conditions of the build-up process via a multiple link 9. For a constant grain flow rate, under the effect of an internal program for driving the build-up process, and via an output link 10 feeding control apparatus 11, the device 8 delivers a control value for controlling the positioning of the nozzle 5 relative to the preform 3, and which positions the nozzle 5 accordingly by displacing it along an axis parallel to the axis X. The apparatus 8 also delivers other control values determining other aspects of the control process via an output multiple link 12.

All the elements of the apparatus shown in FIG. 2 are well known to the person skilled in the art. Others, which are not shown, are also well known. For example, European Patent Application EP-A1-0 440 130 describes means for supporting the preform 3 while driving it in rotation and in translation, a carriage for supporting the plasma torch 4 and the nozzle 5 while driving them in translation parallel to the axis X, and means for determining the angular position of the preform 3 and the longitudinal position of the carriage. Together and in known manner, those means make it possible to move the preform 3 away from the torch 4 as the preform 3 grows. Means are also known for making it possible to point the camera 6 at successive places on the preform 3 in a measuring pass, which means may be in form of a second carriage whose movement is coupled to the movement of the first carriage.

The plasma build up takes place in passes, from right to left, and then from left to right, during which passes the plasma torch 4 and the nozzle 5 sweep along the length of the preform 3.

The entire control process is optimized to obtain high efficiency in terms of the quantity of silica deposited, at a given translation speed and for a given refractive index profile for the build up. Simultaneously, the camera 6 effects a measurement pass, delivering successive values of the diameter of the preform 3 over the entire length thereof.

Figure 3:
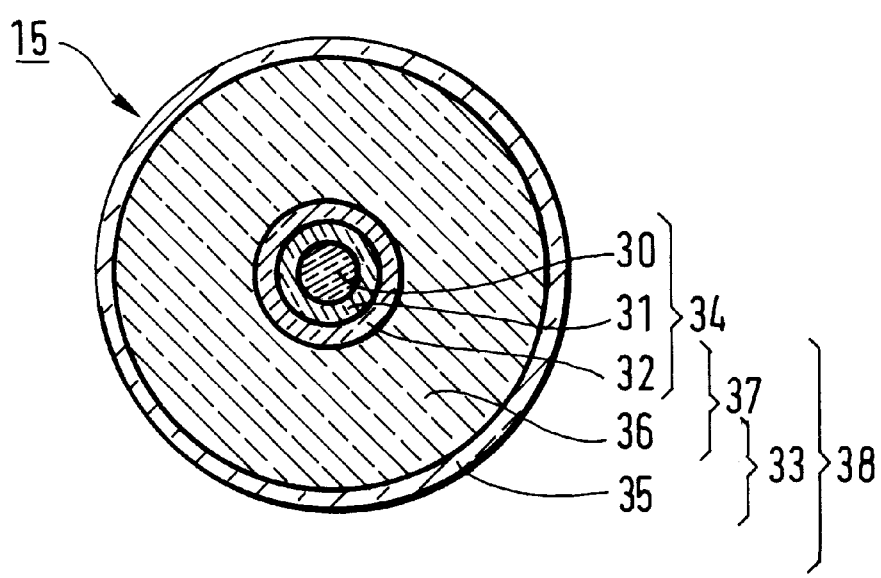
FIG. 3 is a diagrammatic section view of an optical fiber obtained starting from the preform 3 shown in FIG. 2.

FIG. 3 is a diagrammatic section view of an optical fiber 15 obtained starting from the preform 3 and of section that is geometrically similar.

The optical fiber 15 is manufactured by performing hot fiber-drawing on the built-up primary preform 3 of the invention. FIG. 3 shows an optical core 30 and cladding 31, both of which form the optically active portion based on silica, a zone 32, and a build-up zone 33 made up of a portion 36 and of a peripheral zone 35 of silica doped with alumina. Compared with FIG. 1, the zone 32 corresponds to the tube 22, a zone 34 corresponds to the primary preform 24, a zone 37 corresponds to the inner zone 27, and a zone 38 corresponds to the outer sheath 28. Although the portion 36 is not doped intentionally, it can have some alumina content depending on where the alumina comes from, providing it is lower than that of the peripheral zone 35.

The following examples illustrate the invention, without limiting its scope.

EXAMPLES

Example 1
Use of alumina in equivalent concentration equal to about 381 ppm

The primary preform was a bar of diameter 9 R, i.e. of radius 4.5 R, on which bar the plasma build up was performed, the tube 22 extending between radius 2.9 R and radius 4.5 R. A layer of pure silica was deposited first over a thickness of 7.7 R, transforming the primary preform into a bar of radius 12.2 R. Then a peripheral zone of thickness 1.3 R and containing alumina was formed, thereby forming the preform 3 of diameter 13.5 R. A concentration of 2000 ppm of alumina particles $Al_2O_3$, in proportion by weight of aluminum relative to natural silica, was used for building up the primary preform 24 over a thickness 25 of the build-up zone 23. The equivalent concentration of the peripheral zone deposit 25 was then equal to about 381 ppm by weight of aluminum relative to natural silica, for the build-up zone 23 as a whole.

Provision was made to use particles of alumina of ultra pure quality whose maximum size was typically a few tens of micrometers ($\mu$m). Preferably, pyrogenic alumina particles are used of size smaller than 0.1 $\mu$m to facilitate uniform distribution of the particles in the portion 25 of the build-up zone 23.

The optical fiber 15 was manufactured by hot fiber-drawing under a fiber-drawing tension of 85 g, starting from the built-up primary preform 3 of the invention. In general, the fiber-drawing tension lies in the range 10 g to 250 g, and preferably in the range 30 g to 150 g.

The hydrogen permeability performance of said optical fiber 15 was then tested for 400 hours at 70° C. under one atmosphere (1 atm=1.01325×10$^5$ Pa). The attenuation at 1550 nm obtained by the fiber 15 that was subjected to the test was 0.048 dB/km. Compared with a standard optical fiber which was manufactured under identical conditions, except that there was no alumina in a peripheral zone 34 of the build up, and which had attenuation after the hydrogen test that was equal to 0.07 dB/km, the improvement in attenuation was about 31%.

In addition, the traction strength performance of the optical fiber 15 was tested by a traction test. Such a test is a standardized test which consists in applying traction to the fiber and in measuring the force required to break it. The test was performed on 50 fibers and a statistical distribution was obtained. In the distribution, the mean for fiber 15 was 60 newtons, as against 57 newtons for the above-defined standard optical fiber, i.e. an improvement lying in the range 5% to 10% was obtained compared with said standard optical fiber.

The stress profile of said fiber 15 was determined by measuring the compression of the surface, using a method based on birefringence. Birefringence is measured by the difference in path length between the polarizations propagating along the fast axis of the fiber and along the slow axis thereof, by using an optical method derived from the "quarter-wave plate" method. The compression of the surface was 40 MPa over 5 μm, as against the value of compression of the above-defined standard optical fiber, which value was equal to 5 MPa over 5 μm, the accuracy of the measurement being estimated at ±10%.

Example 2

Use of alumina in equivalent concentration equal to about 762 ppm

The primary preform 24 was a tube of diameter 9 R, i.e. of radius 4.5 R, on which tube the plasma build up was performed, the tube 22 extending between radius 2.9 R and radius 4.5 R. A layer of pure silica was deposited first over a thickness of 7.7 R, transforming the primary preform into a bar of radius 12.2 R. Then a peripheral zone of thickness 1.3 R and containing alumina was formed, thereby forming the preform 3 of diameter 13.5 R. A concentration of 4000 ppm of alumina particles Al$_2$O$_3$, in proportion by weight of aluminum relative to natural silica, was used for building up the primary preform 24 in the peripheral zone 25 of the build-up zone 23. The equivalent concentration of the peripheral zone deposit 25 was then equal to about 762 ppm by weight of aluminum relative to natural silica, for the entire build-up zone 23.

The alumina source was similar to that of Example 1. The optical fiber 15 was manufactured by hot fiber-drawing under a fiber-drawing tension of 85 g, starting from the built-up primary preform 3 of the invention, in the same way as in Example 1.

The hydrogen permeability performance of said optical fiber 15 was then tested for 400 hours at 70° C. under one atmosphere (1 atm). The attenuation at 1550 nm obtained by the fiber 15 that was subjected to the test was 0.049 dB/km. Compared with a standard optical fiber which was manufactured under identical conditions, except that there was no alumina in a peripheral zone 34 of the build up, and which had attenuation after the hydrogen test that was equal to 0.07 dB/km, the improvement in attenuation was about 30%.

Naturally, the method of the invention is not limited to the examples described herein. In particular, it may be used not only for plasma build-up methods, but also for other methods such as OVD, sol-gel methods, impregnation, vapor deposition, or evaporation.

What is claimed is:

1. An optical fiber preform based on silica and comprising a core of radius R, and a sheath, said sheath comprising an optical inner portion in direct contact with the core, and referred to as a "cladding", and an outer portion referred to as an "outer sheath", said outer sheath being made of silica doped with alumina, wherein the outer sheath itself comprises an inner portion in direct contact with the cladding, and referred to as an "inner zone", and an outer portion in direct contact with the inner zone and referred to as a "peripheral zone" mainly comprising silica doped with alumina, wherein a thickness of said peripheral zone lies in a range of 0.08 R to 2.2 R, and wherein a concentration by weight of alumina in the peripheral zone is such that a total concentration of alumina in the outer sheath as a whole lies in a range of 100 ppm to 1000 ppm by weight of aluminum relative to silica.

2. A preform according to claim 1, in which the concentration by weight of alumina in the peripheral zone is such that the total concentration of alumina in the outer sheath as a whole lies in a range of 100 ppm to 500 ppm by weight of aluminum relative to silica.

3. A preform according to claim 1, in which the thickness of the peripheral zone lies in a range of 0.08 R to 1.5 R.

4. A preform according to claim 1, in which the inner zone also contains alumina, in a concentration smaller than the concentration of the peripheral zone and such that the total concentration of alumina in the outer sheath as a whole lies in a range of 50 ppm to 200 ppm by weight of aluminum relative to silica.

5. A preform according to claim 4, in which the concentration of alumina in the inner zone is such that the total concentration of alumina in the outer sheath as a whole lies in a range of 50 ppm to 150 ppm by weight of aluminum relative to silica.

6. A method of manufacturing a preform based on silica, comprising the steps of:

providing a core of radius R, and a sheath said sheath, comprising an optical inner portion in direct contact with the core, and referred to as a "cladding", and an outer portion referred to as an "outer sheath", said outer sheath being made of silica doped with alumina, wherein the outer sheath itself comprises an inner portion in direct contact with the cladding and referred to as an "inner zone", and an outer portion in direct contact with the inner zone and referred to as a "peripheral zone" mainly comprising silica doped with alumina, wherein a thickness of said peripheral zone lies in a range of 0.08 R to 2.2 R, and wherein a concentration by weight of alumina in the peripheral zone is such that a total concentration of alumina in the outer sheath as a whole lies in a range of 100 ppm to 1000 ppm by weight of aluminum relative to silica; and wherein said peripheral zone is formed by externally depositing at least one layer of silica doped with alumina.

7. A method according to claim 6, in which the external deposition method is performed by plasma building-up.

8. A method according to claim 6, in which the external deposition method is performed by OVD.

9. A method of manufacturing an optical fiber from a preform based on silica, comprising the steps of:

providing a preform having a core of radius R, and a sheath, said sheath comprising an optical inner portion in direct contact with the core, and referred to as a "cladding", and an outer portion referred to as an "outer sheath", said outer sheath being made of silica doped with alumina, wherein the outer sheath itself comprises an inner portion in direct contact with the cladding and referred to as an "inner zone", and an outer portion in direct contact with the inner zone and referred to as a "peripheral zone" mainly comprising silica doped with alumina, wherein a thickness of said peripheral zone lies in a range of 0.08 R to 2.2 R, and wherein a concentration by weight of alumina in the peripheral zone is such that a total concentration of alumina in the outer sheath as a whole lies in a range of 100 ppm to 1000 ppm by weight of aluminum relative to silica;

wherein said peripheral zone is formed by externally depositing at least one layer of silica doped with alumina; and performing hot fiber-drawing on said preform.

10. An optical fiber from a preform based on silica, comprising:

a core of radius R, and a sheath, said sheath comprising an optical inner portion in direct contact with the core, and referred to as a "cladding", and an outer portion referred to as an "outer sheath", said outer sheath being made of silica doped with alumina, wherein the outer sheath itself comprises an inner portion in direct contact with the cladding and referred to as an "inner zone", and an outer portion in direct contact with the inner zone and referred to as a "peripheral zone" mainly comprising silica doped with alumina, wherein a thickness of said peripheral zone lies in a range of 0.08 R to 2.2 R, and wherein a concentration by weight of alumina in the peripheral zone is such that a total concentration of alumina in the outer sheath as a whole lies in a range of 100 ppm to 1000 ppm by weight of aluminum relative to silica;

wherein said peripheral zone is formed by externally depositing at least one layer of silica doped with alumina; and wherein said preform is hot fiber-drawn into said optical fiber.

* * * * *